United States Patent
Kuczmik et al.

(10) Patent No.: US 10,919,471 B2
(45) Date of Patent: Feb. 16, 2021

(54) MULTIPART APRON FOR A VEHICLE

(71) Applicant: SIEMENS MOBILITY GMBH, Munich (DE)

(72) Inventors: Michael Kuczmik, Erlangen (DE); Linda Schoenweiss, Erlangen (DE); Konstantin Rubinchik, Nuremberg (DE); Fritz Leiker, Lingen (DE); Lars Buchmann, Erlangen (DE); Dirk Jolas, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 136 days.

(21) Appl. No.: 16/310,042

(22) PCT Filed: May 19, 2017

(86) PCT No.: PCT/EP2017/062099
§ 371 (c)(1),
(2) Date: Dec. 14, 2018

(87) PCT Pub. No.: WO2017/215883
PCT Pub. Date: Dec. 21, 2017

(65) Prior Publication Data
US 2019/0143918 A1   May 16, 2019

(30) Foreign Application Priority Data

Jun. 14, 2016 (DE) .................. 10 2016 210 514

(51) Int. Cl.
*B60R 19/04* (2006.01)
*B61D 17/04* (2006.01)
*B61F 19/04* (2006.01)

(52) U.S. Cl.
CPC .............. *B60R 19/04* (2013.01); *B61D 17/04* (2013.01); *B61F 19/04* (2013.01); *Y02T 30/00* (2013.01)

(58) Field of Classification Search
CPC ......... B65D 47/0814; B65D 2101/0023; F02F 3/00; F02F 3/02; D01H 5/26;
(Continued)

(56) References Cited

U.S. PATENT DOCUMENTS 1,651,005 A * 11/1927 Veale ...................... B60R 19/14
293/150
1,705,119 A * 3/1929 Jacobs .................... B60R 19/14
293/150
(Continued)

FOREIGN PATENT DOCUMENTS

DE          2927036 A1    1/1981
DE         19546478 A1    6/1997
(Continued)

*Primary Examiner* — Kiran B Patel
(74) *Attorney, Agent, or Firm* — Laurence Greenberg; Werner Stemer; Ralph Locher

(57) ABSTRACT

An apron for a vehicle is formed of a plurality of partial aprons. In order to prevent damage to the apron requiring a complete replacement of the apron, the novel apron has a plurality of partial aprons, wherein at least one of the partial aprons has a predetermined breaking point that is configured to break earlier than the other partial apron in case of mechanical stress.

9 Claims, 3 Drawing Sheets

(58) Field of Classification Search
CPC ... A41D 13/04; G21F 3/00; G21F 3/02; Y10S 2/913; B32B 2571/00
See application file for complete search history.

(56) References Cited

U.S. PATENT DOCUMENTS

| | | | | |
|---|---|---|---|---|
| 2,954,256 A * | 9/1960 | Barenyi | ............ | B60R 19/04 293/136 |
| 3,596,963 A * | 8/1971 | Phillips | ............ | B60R 19/04 293/6 |
| 3,820,834 A * | 6/1974 | Wilfert et al. | ............ | B60R 19/14 293/150 |
| 3,843,180 A * | 10/1974 | Alexander | ............ | B60R 19/14 293/150 |
| 3,907,352 A * | 9/1975 | Spain | ............ | B60R 19/04 293/152 |
| 3,924,888 A * | 12/1975 | Butcher | ............ | B60R 19/14 293/150 |
| 4,130,312 A * | 12/1978 | Cooper, Sr. | ............ | B60R 19/04 293/153 |
| 4,196,355 A * | 4/1980 | Maine | ............ | A61B 6/107 250/516.1 |
| 4,225,167 A * | 9/1980 | Buettner | ............ | B60R 19/14 293/120 |
| 4,291,911 A * | 9/1981 | Gallmeyer | ............ | B62D 35/001 296/77.1 |
| 4,333,674 A * | 6/1982 | Buettner | ............ | B60R 19/14 293/120 |
| 4,402,537 A * | 9/1983 | Gallitzendorfer | ............ | B60R 19/04 293/149 |
| 6,767,039 B2 * | 7/2004 | Bird | ............ | B60R 19/04 293/150 |
| 7,303,219 B2 * | 12/2007 | Trabant | ............ | B60R 19/24 293/120 |
| 7,475,531 B2 * | 1/2009 | Artzt | ............ | D01H 5/26 19/244 |
| 7,527,308 B2 * | 5/2009 | Buniewicz | ............ | B60R 19/04 280/164.1 |
| 7,552,955 B2 * | 6/2009 | Evans | ............ | B60R 19/18 293/120 |
| 8,375,869 B2 | 2/2013 | Mayer | | |
| D820,741 S * | 6/2018 | Patel | ............ | D12/169 |
| 10,081,321 B2 * | 9/2018 | Fabiano | ............ | B60R 19/04 |
| 10,343,635 B2 * | 7/2019 | Zhang | ............ | B60R 19/02 |
| 2006/0249961 A1 * | 11/2006 | Flotzinger | ............ | B60R 19/04 293/115 |
| 2010/0176617 A1 * | 7/2010 | Khazaal | ............ | B60D 1/56 296/1.08 |
| 2011/0011302 A1 * | 1/2011 | Mayer | ............ | B61D 15/06 105/392.5 |
| 2011/0204680 A1 * | 8/2011 | Fortin | ............ | B60R 19/18 296/193.1 |
| 2017/0001514 A1 * | 1/2017 | Watari | ............ | B60R 19/52 |
| 2018/0304843 A1 * | 10/2018 | Vacca | ............ | B60R 21/34 |

FOREIGN PATENT DOCUMENTS

| | | |
|---|---|---|
| EP | 0779183 A1 | 6/1997 |
| WO | 2009112095 A1 | 9/2009 |
| WO | 2012099020 A1 | 7/2012 |

* cited by examiner

MULTIPART APRON FOR A VEHICLE

BACKGROUND OF THE INVENTION

Field of the Invention

The present invention concerns a multipart apron for a vehicle, with at least a first and a second partial apron which are connected together by means of at least one connecting element so as to be able to be separated from and attached to each other repeatedly.

Aprons and for example front or rear aprons for a vehicle are generally known. If the apron is damaged, for example in an accident, in many modern vehicles this must be replaced completely since known aprons, in particular when made of plastic, quickly break when damaged in an accident and cannot be easily repaired. For example, in trams but also in other vehicles, it is however possible that the damage to the apron affects a small area or often occurs in certain regions of the apron. Despite such locally restricted damage, the entire apron must be replaced, which is disadvantageous from financial and environmental aspects.

Publication DE 195 46 478 A1 discloses a multipiece bumper cladding for motor vehicles in which the individual components can be connected releasably via connecting plates. Publication DE 29 27 036 A1 teaches a bumper for motor vehicles which has a profiled supporting part and a replaceable energy absorption member.

SUMMARY OF THE INVENTION

The object on which the invention is based is therefore to provide an apron for a vehicle which allows simple repair of damage to the apron.

According to the invention, a multipart apron for a vehicle is provided, wherein the apron has at least a first and a second partial apron. The partial aprons are connected together by means of at least one connecting element so as to be able to be separated from and attached to each other repeatedly. The first partial apron has at least one predetermined breaking point formed as a structural weakening, which is designed to break earlier than the connecting element and/or the second partial apron under mechanical load. Furthermore, according to the invention, a partial apron for an apron for a vehicle is provided, wherein at least one predetermined breaking point is provided which is formed as a structural weakening.

The embodiment of the apron according to the invention with several partial aprons which can be attached to each other via the connecting element, and with the predetermined breaking point, has the advantage that the damage affects only the partial apron which is loaded, for example in an accident, and which comprises the predetermined breaking point. The predetermined breaking point breaks before the load occurring during the damage to the first partial apron also damages the second partial apron. Because of the releasable connecting element, the damaged partial apron can easily be replaced by an undamaged and where possible new partial apron.

The solution according to the invention may be further improved by various embodiments which are each advantageous in themselves and may be combined arbitrarily unless otherwise specified. These embodiments and their associated advantages are discussed below.

The predetermined breaking point may be provided as a material weakening, for example a thinned or hollow material cross-section. Material weakening points may be provided precisely where the first partial apron should break under mechanical overload. Furthermore, material weakening points may easily be monitored in a non-destructive fashion and for example visually or using ultrasound.

The first partial apron may be formed with a reinforcing rib comprising the predetermined breaking point. If the first partial apron comprises several reinforcing ribs, selected ribs of the several reinforcing ribs may have predetermined breaking points and for example material weakening points arranged along a curve or a line, so that the first partial apron breaks along this curve or line under mechanical overload.

At least the first partial apron may be formed by an additive process. An additive production process may also be described as a generative production. For example, the first partial apron may be made from glass-fiber laminate. For example, at least the first partial apron may be produced by 3-D printing or by bonding of composite matting. In this way, differently shaped partial aprons can be produced easily without the need for manufacture of costly tools. Furthermore, in an additive production method, the hollow material cross-section providing the predetermined breaking point can be produced easily.

The apron may comprise a third partial apron, wherein in mounted state of the apron, the second partial apron is arranged between the first partial apron and the third partial apron. The first and third partial aprons may therefore be regarded as the side parts of the apron. The second partial apron may be attached to the first and the third partial aprons by means of at least one respective connecting element so as to be able to be separated and reconnected repeatedly. The third partial apron too may have at least one predetermined breaking point formed as a structural weakening, which is designed to break earlier than the connecting element connecting the second partial apron to the third partial apron and/or than the second partial apron under mechanical load. In particular in accidents in which a vehicle hits the apron at the side, only the damaged partial apron need be replaced. The central, second partial apron need not be replaced in this case.

The predetermined breaking point of the third partial apron may be formed as a material weakening, for example a thinned or hollow material cross-section. Material weakening points may be provided precisely where the third partial apron should break under mechanical overload. Furthermore, material weakening points may easily be monitored in a non-destructive fashion and for example visually or using ultrasound.

The third partial apron may be formed with a reinforcing rib comprising the predetermined breaking point. If the third partial apron comprises several reinforcing ribs, selected ribs of the several reinforcing ribs may have predetermined breaking points and for example material weakening points arranged along a curve or a line, so that the third partial apron breaks along this curve or line under mechanical overload.

The third partial apron may be formed by an additive process, wherein such a production process may have the same advantages for the third partial apron as for the first partial apron. For example, the third partial apron may be made from glass-fiber laminate.

The connecting element may for example be a screw with or without a lock screw or lock nut. Alternatively, the connecting element may be a rivet which must be destroyed to release the connections.

The inner second partial apron may be formed without a predetermined breaking point, so that only the first partial apron or the first and the third partial aprons each have at least one respective predetermined breaking point.

The vehicle may be any arbitrary land-craft, water-craft or aircraft. In particular, the vehicle may be a motor vehicle. For example, the vehicle may be a car or a train, for example a tram.

The apron may be described as a body component. In particular, the apron may be a three-part with the first, second and third partial aprons.

At least the partial apron comprising the predetermined breaking point may be provided separately as a replacement part.

The invention furthermore comprises a motor vehicle which comprises a multipart apron according to the invention as a front and/or rear apron.

BRIEF DESCRIPTION OF THE SEVERAL VIEWS OF THE DRAWING

The properties, features and advantages of this invention as described above, and the manner in which these are achieved, will become clearer and significantly more comprehensible in connection with the following description of the exemplary embodiments, which are explained in more detail below in connection with the drawings. The drawings show.

DESCRIPTION OF THE INVENTION

The invention is explained as an example below with reference to embodiments relating to the drawings. The different features of the embodiments may be combined with each other independently, as has already been explained for the individual advantageous embodiments.

Figure 1:
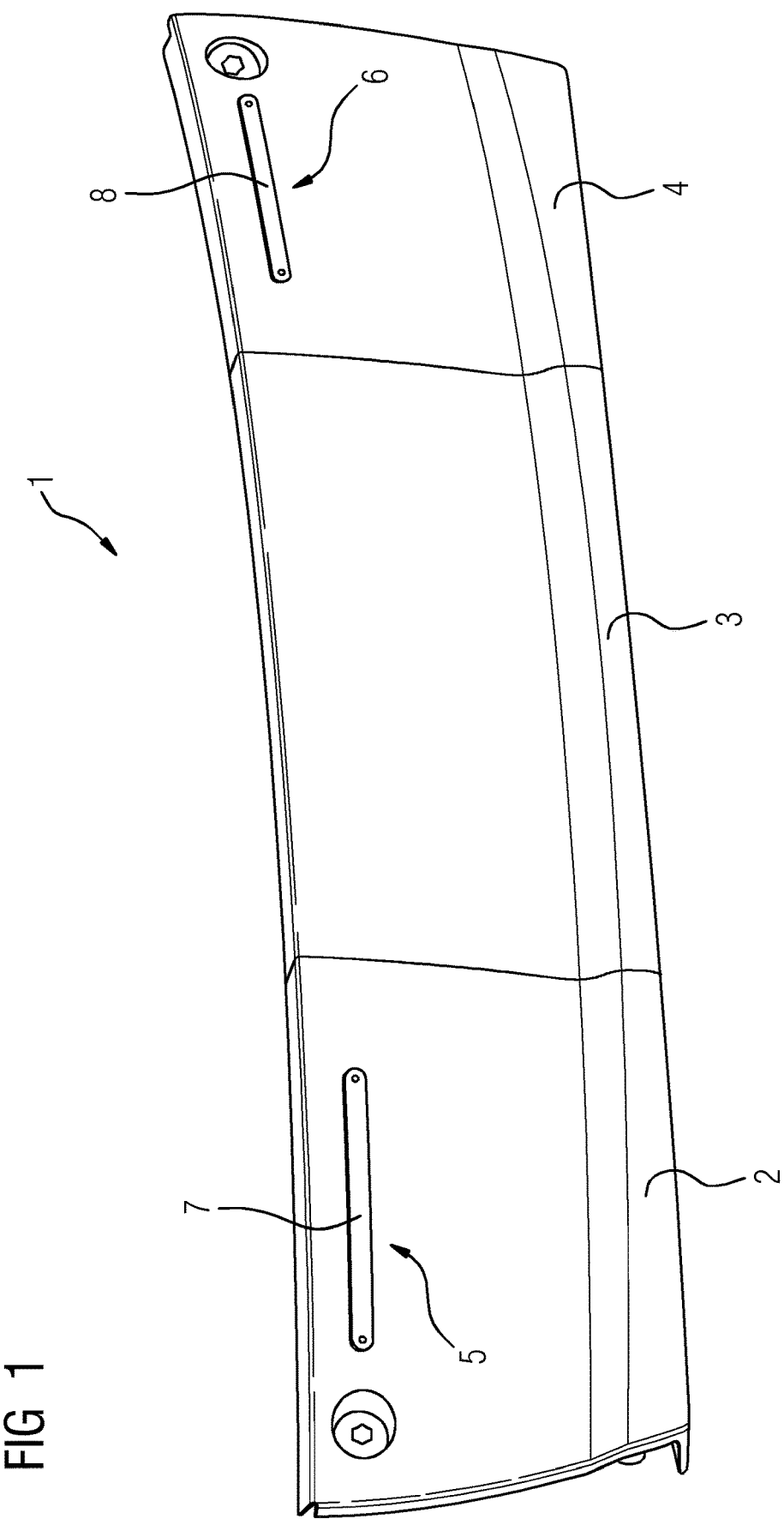
FIG. 1 a diagrammatic front view of an exemplary embodiment of the apron according to the invention, FIG. 2 a diagrammatic rear view of the exemplary embodiment in FIG. 1, FIG. 3 a portion of the exemplary embodiment of FIGS. 1 and 2 in front view, and FIG. 4 a sectional view of the previous exemplary embodiment.

FIG. 1 shows in a frontal view a three-part apron 1 for a vehicle as an example of a multipart apron. In mounted state of the apron 1, the side visible in the figure points in the direction of travel of the vehicle. The apron 1 has a first partial apron 2, a second partial apron 3 and a third partial apron 4. The second partial apron 3 is shown between the first partial apron 2 and the third partial apron 4, and is attached to these. The second partial apron 3 may be described as the middle partial apron, and the first partial apron 2 and third partial apron 4 may be described as outer partial aprons.

The first partial apron 2 and/or the third partial apron 4 may each have at least one receiver 5, 6, wherein the receivers 5, 6 may be open at least partially in the direction of travel of the vehicle. The receivers 5, 6 may be configured to receive for example at least portions of daytime running lights 7, 8 or other elements such as flashers.

In the assembled state, the apron 1 may be suitable for handling integrally with or without daytime running lights 7, 8, whereby mounting of the apron 1 on the vehicle becomes easier.

Figure 2:
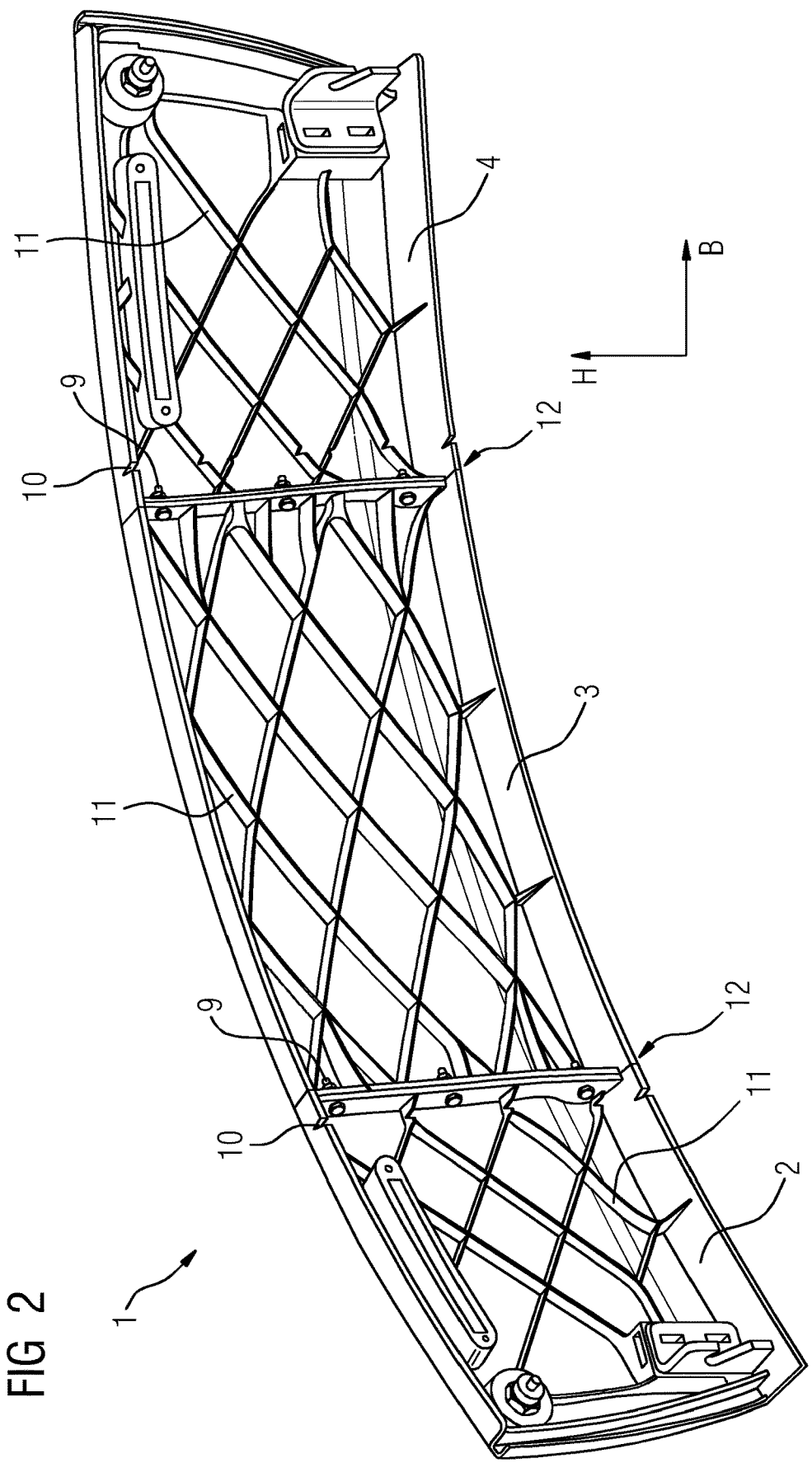

FIG. 2 shows the exemplary embodiment in FIG. 1 in a rear view, wherein the visible side of the apron 1 shown may face towards the interior of the vehicle when the apron 1 is mounted on the vehicle. The first and the third partial aprons 2, 4 are each attached fixedly but releasably by means of at least one connecting element 9 to the second partial apron 3.

At least one of the partial aprons 2, 3, 4, and for example the first partial apron 2 and/or the third partial apron 4, may have a predetermined breaking point 10 formed as a structural weakening. If an object, for example another vehicle, impacts against the partial apron 2, 3, 4 formed with the predetermined breaking point 10, this partial apron 2, 3, 4 breaks at the predetermined breaking point 10 before the adjacent partial apron 2, 3, 4 can be damaged. For this, the predetermined breaking point 10 may be configured to break earlier than the connecting element 9 and/or the adjacent partial apron 2, 3, 4 under mechanical load.

The predetermined breaking point 10 may be provided as a material weakening. In the exemplary embodiment of FIG. 2, the first partial apron 2 and the third partial apron 4 have thinned and in particular slotted portions to form the predetermined breaking point, wherein the material weakening points of the exemplary embodiment of FIG. 2 are aligned with each other in a height direction H of the apron 1. A width direction B of the apron 1 runs transversely to this height direction H. The partial aprons 2, 3, 4 are arranged behind each other in the width direction B. The predetermined breaking points 10, provided for example by slots in FIG. 2, open in particular away from the front of the apron 1, i.e. in mounted state against the direction of travel of the vehicle if the apron is a front apron. If the apron 1 is a rear apron, the slots may open also in the direction of travel i.e. into the interior of the vehicle.

As an alternative to the thinner material cross-section depicted, the material cross-section of the respective partial apron 2, 3, 4 may be also be provided as a hollow material cross-section. Since a hollow material cross-section would not however be visible in the view of FIG. 2, this exemplary embodiment has not been depicted.

To guarantee that both the apron 1 and at least one of the partial aprons 2, 3, 4 have sufficient stiffness for mounting and operation and to be able to conduct mechanical forces efficiently to the predetermined breaking point 10, at least the partial apron 2, 3, 4 having the predetermined breaking point 10, for example the first partial apron 2 and/or the third partial apron 4, may have at least one reinforcing rib 11. The second partial apron 3 may also have at least one reinforcing rib 11. The predetermined breaking point 10 may run through the at least one reinforcing rib 11 of the respective partial apron 2, 4.

Preferably, the predetermined breaking point 10 is formed in the vicinity of a contact region 12 in which the first partial apron 2 or the third partial apron 4 makes contact with the second partial apron 3. For example, the predetermined breaking point 10 has a distance of up to 50 mm, up to 40 mm, up to 30 mm, up to 20 mm or up to 10 mm from the contact region 12. This guarantees that a mechanical load occurring also in the vicinity of the connecting element 9 is prevented from damaging the second partial apron 3 by the predetermined breaking point 10.

Figure 3:
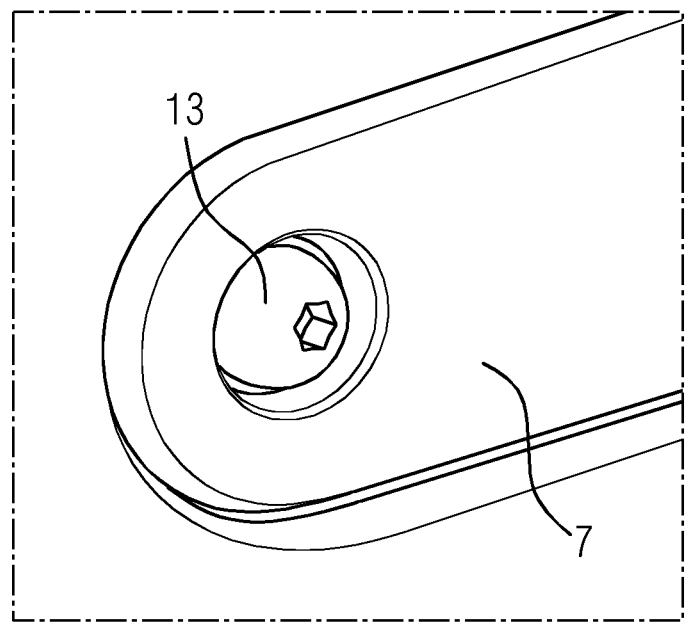

FIG. 3 shows an enlarged portion of the apron 1 of the exemplary embodiment of FIGS. 1 and 2, and in particular the front view of the FIG. 1 with the daytime running light 7. A fixing element 13, for example a screw, is provided for attaching the daytime running light 7.

Figure 4:
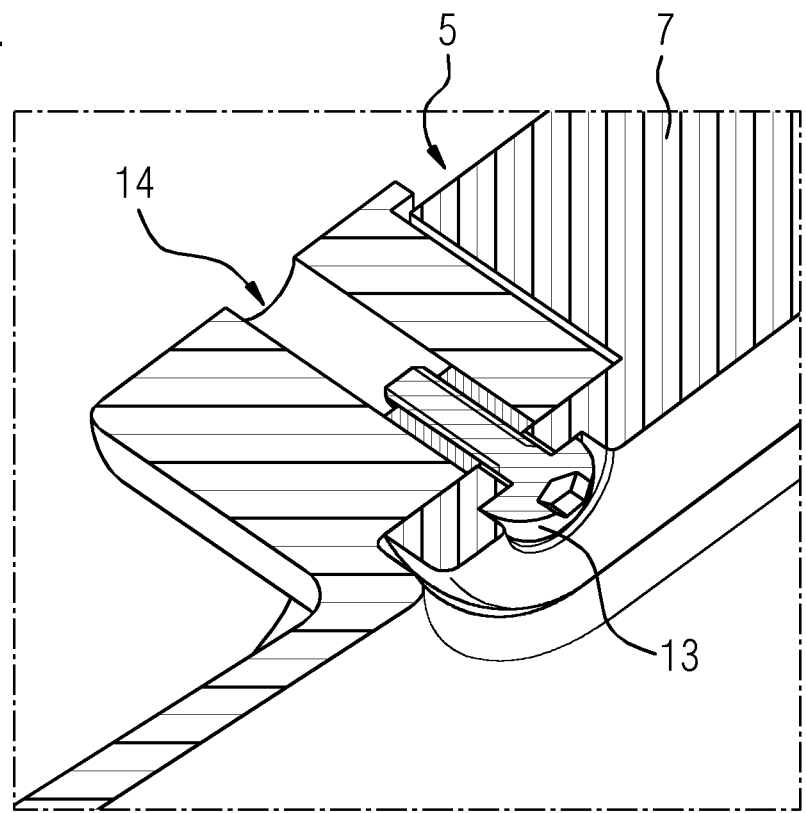

FIG. 4 shows the enlarged view of FIG. 3 in a sectional depiction, wherein the section plane runs along the width direction B and transversely to the height direction H.

The fixing element 13 is arranged in a fixing receiver 14 provided through the apron 1 and is attached to the apron 1 therein. The fixing receiver 14 is adjacent to the receiver 5 but separate from the receiver 5. Undamaged daytime running lights 7 can therefore easily be changed if the partial apron 2, 4 must be replaced. This also applies to the daytime running light 8 if the third partial apron 4 is formed with the fixing receiver 14. The fixing receiver 14 may extend parallel to the direction of travel and be provided as a continuous or a closed opening.

The invention claimed is:

1. A multipart apron for a vehicle, the multipart apron comprising:
    a first partial apron and a second partial apron;
    at least one connecting element disposed to connect said first and second partial aprons to one another in an end to end position along a width direction of the multipart apron at a joint between said first and second partial aprons and to enable said first and second partial aprons to be repeatedly separated from and attached to each other;
    said first partial apron being formed with a structural weakening defining a predetermined breaking point configured to break earlier, when subjected to a mechanical load, than said at least one connecting element and/or said second partial apron, said predetermined breaking point being a material cross section reduction at a position offset from said joint in the width direction of the multipart apron.

2. The multipart apron according to claim 1, wherein said predetermined breaking point is a material weakening in said first partial apron.

3. The multipart apron according to claim 1, wherein said first partial apron is formed by an additive process.

4. The multipart apron according to claim 1, which further comprises a third partial apron and wherein:
    in a mounted state of the multipart apron, said second partial apron is arranged between said first partial apron and said third partial apron and attached to said first and third partial aprons by way of at least one respective said connecting element so as to be able to be separated and reconnected repeatedly; and
    said third partial apron is formed with a structural weakening defining a predetermined breaking point configured to break earlier than said connecting element between said second partial apron and said third partial apron and/or than said second partial apron under mechanical load.

5. The multipart apron according to claim 4, wherein said third partial apron is formed by an additive process.

6. A motor vehicle, comprising a multipart apron according to claim 1 formed as one of a front apron or a rear apron of the motor vehicle.

7. The motor vehicle according to claim 6, wherein the motor vehicle is a rail vehicle.

8. The multipart apron according to claim 2, wherein said material weakening is a thinned or hollow material cross-section.

9. The multipart apron according to claim 1, wherein said first partial apron is formed with a reinforcing rib and said reinforcing rib is formed with said predetermined breaking point.

* * * * *